United States Patent
Kanda et al.

(10) Patent No.: US 12,039,233 B2
(45) Date of Patent: Jul. 16, 2024

(54) OPTIMIZATION APPARATUS AND OPTIMIZATION METHOD

(71) Applicant: FUJITSU LIMITED, Kawasaki (JP)

(72) Inventors: Kouichi Kanda, Chofu (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 815 days.

(21) Appl. No.: 17/183,408

(22) Filed: Feb. 24, 2021

(65) Prior Publication Data

US 2021/0303754 A1    Sep. 30, 2021

(30) Foreign Application Priority Data

Mar. 26, 2020   (JP) ................................. 2020-055372

(51) Int. Cl.
*G06F 30/20* (2020.01)
*G06F 111/06* (2020.01)
*G06N 10/00* (2022.01)

(52) U.S. Cl.
CPC ............. *G06F 30/20* (2020.01); *G06N 10/00* (2019.01); *G06F 2111/06* (2020.01)

(58) Field of Classification Search
CPC ...... G06F 30/20; G06F 2111/06; G06N 10/00
USPC ........................................................... 703/2
See application file for complete search history.

(56) References Cited

U.S. PATENT DOCUMENTS

| | | | | |
|---|---|---|---|---|
| 2016/0062951 A1* | 3/2016 | Yoshimura | ............. | G11C 19/08 |
| | | | | 708/190 |
| 2016/0063391 A1* | 3/2016 | Hayashi | ................. | G06F 7/588 |
| | | | | 706/11 |
| 2018/0075342 A1* | 3/2018 | Tamura | ................... | G06N 3/044 |
| 2018/0349325 A1* | 12/2018 | Okuyama | ................ | G06F 7/48 |

(Continued)

FOREIGN PATENT DOCUMENTS

| | | |
|---|---|---|
| JP | 2016-051349 A | 4/2016 |
| JP | 2018-041351 A | 3/2018 |

OTHER PUBLICATIONS

Matsubara et al. (Ising-Model Optimizer with Parallel-Trial Bit-Sieve Engine, Springer International Publishing AG 2018, pp. 432-438) (Year: 2018).*

Thomas et al. (Exact algorithm for sampling the two-dimensional Ising spin glass, The American Physical Society, 2009, pp. 1-16) (Year: 2009).*

(Continued)

*Primary Examiner* — Iftekhar A Khan
(74) *Attorney, Agent, or Firm* — Fujitsu Intellectual Property Center

(57) ABSTRACT

A method includes: accessing first storage configured to store a first weight coefficient group which is at least some of a plurality of weight coefficients indicating a magnitude of interaction between a plurality of state variables in an evaluation function representing energy of an Ising model; accessing a plurality of second storages each of the plurality of second storage being configured to store a second weight coefficient group related to a state variable having a value of 1 in any of a plurality of state variable groups respectively including the plurality of state variables among the plurality of weight coefficients; outputting, for each of the plurality of (Continued)

state variable groups, a search result obtained by performing searching processing configured to perform processing of searching for an optimum solution by repeatedly performing a first update process with a first constraint or a second update process with a second constraint.

7 Claims, 8 Drawing Sheets

(56) References Cited

U.S. PATENT DOCUMENTS

| | | | | |
|---|---|---|---|---|
| 2019/0130295 | A1* | 5/2019 | Okuyama | G06F 17/11 |
| 2019/0235834 | A1* | 8/2019 | Yoneoka | G06F 17/11 |
| 2019/0278829 | A1* | 9/2019 | Takatsu | G06F 17/17 |
| 2020/0042570 | A1* | 2/2020 | Tamura | G06F 17/11 |
| 2020/0050921 | A1* | 2/2020 | Tamura | G06N 3/047 |
| 2020/0380065 | A1* | 12/2020 | Tomita | G06Q 10/0631 |
| 2020/0401651 | A1* | 12/2020 | Tamura | G06F 17/11 |
| 2020/0410372 | A1* | 12/2020 | Miyazawa | G06F 17/11 |
| 2021/0173978 | A1* | 6/2021 | Mishina | G06F 30/20 |
| 2021/0248507 | A1* | 8/2021 | Jippo | G06F 17/11 |
| 2021/0256090 | A1* | 8/2021 | Watanabe | G06N 3/047 |
| 2021/0286919 | A1* | 9/2021 | Kushibe | G06N 7/01 |
| 2021/0303755 | A1* | 9/2021 | Kanda | G06F 30/20 |
| 2021/0312108 | A1* | 10/2021 | Matsuura | G06N 5/01 |

OTHER PUBLICATIONS

Liu et al. (Quasi-adiabatic quantum Monte Carlo algorithm for quantum evolution in imaginary time, APS Physics, 2013, pp. 1-15) ( Year: 2013).*
European Office Action dated Dec. 13, 2023 for corresponding European Patent Application No. 21158649.0, 12 pages.
Chinese Office Action mailed May 19, 2023 for corresponding Chinese Patent Application No. 202110264219.2, with Partial English Translation, 17 pages.
Matsubara, Satoshi et al., "Digital Annealer for High-Speed Solving of Combinatorial Optimization Problems and Its Applications", 2020 25TH Asia and South Pacific Design Automation Conference (ASP-DAC), IEEE, XP033746210, pp. 667-672, Jan. 13, 2020.
Tsukamoto, Sanroku et al., "An Accelerator Architecture for Combinatorial Optimization Problems", Fujitsu Scientific & Technical Journal (FSTJ), vol. 53, No. 5, XP055673462, pp. 8-13, Sep. 1, 2017.
Liu, Xiaoyuan et al., "On Modeling Local Search with Special-Purpose Combinatorial Optimization Hardware", arxiv.org, Cornell University Library, 201 Olin Library Cornell University Ithaca, NY 14853, XP081585677, pp. 1-24, Nov. 22, 2019.
Dabiri, Keivan et al., "Replica Exchange MCMC Hardware With Automatic Temperature Selection and Parallel Trial", IEEE Transactions on Parallel and Distributed Systems, IEEE Service Center, Los Alamitos, CA, US, vol. 31, No. 7, XP011776259, pp. 1681-1692, Mar. 5, 2020.
Extended European Search Report dated Aug. 12, 2021 for corresponding European Patent Application No. 21158649.0, 11 pages.

* cited by examiner

FIG. 4

OPTIMIZATION APPARATUS AND OPTIMIZATION METHOD

CROSS-REFERENCE TO RELATED APPLICATION

This application is based upon and claims the benefit of priority of the prior Japanese Patent Application No. 2020-55372, filed on Mar. 26, 2020, the entire contents of which are incorporated herein by reference.

FIELD

The embodiments discussed herein are related to an optimization apparatus and an optimization method.

BACKGROUND

As an apparatus that calculates a large-scale discrete optimization problem which is not easily handled by a Neumann-type computer, there is an Ising machine (also referred to as a Boltzmann machine) using an Ising type evaluation function (also referred to as an energy function or the like).

In calculation by an Ising machine, a problem of a calculation target is replaced with the Ising model that is a model indicating the behavior of a spin of a magnetic body. A state in which the value of the Ising model type evaluation function (corresponding to the energy of the Ising model) is minimized is searched by a Markov chain Monte Carlo method such as a simulated annealing method or a replica exchange method (also referred to as an exchange Monte Carlo method).

In the related art, there is an optimization apparatus that searches for a state in which energy is minimized by performing a Markov chain Monte Carlo method using a digital circuit. The optimization apparatus in the related art calculates the amount of change in energy (hereinafter, simply referred to as energy change in some cases) assuming that only the value of one state variable changes at one time and determines whether or not to allow a change in bit according to the value obtained by adding the noise value corresponding to the temperature to the energy change. A change in the value of the state variable with increasing energy is also allowed with a predetermined probability, and the probability decreases as the temperature decreases.

There is an optimization problem having a constraint (1-hot constraint) in which the number of state variables having a value of 1 among a plurality of state variables included in an evaluation function is only one. As the 1-hot constraint, there are a constraint in which each state variable appears only one time in a set of constraint equations and a constraint in which the sum of values of the state variables included in each row and each column is 1 when $N^2$ state variables are arranged in a matrix form of N rows and N columns. Hereinafter, the former 1-hot constraint is referred to as a 1-Way 1-hot constraint, and the latter 1-hot constraint is referred to as a 2-Way 1-hot constraint.

For example, for nine state variables ($x_1$ to $x_9$), a constraint in which $x_1+x_2+x_3=1$, $x_4+x_5+x_6=1$, and $x_7+x_8+x_9=1$ is a 1-Way 1-hot constraint. Traffic optimization problems, bin packing problems, and the like have a 1-Way 1-hot constraint.

For example, when $x_1$ to $x_9$ are arranged in a matrix form of three rows and three columns, a constraint in which $x_1+x_2+x_3=1$, $x_4+x_5+x_6=1$, $x_7+x_6+x_9=1$, $x_1+x_4+x_7=1$, $x_2+x_9+x_8=1$, and $x_3+x_6+x_9=1$ is a 2-Way 1-hot constraint. Traveling salesman problems, vehicle allocation planning problems, quadratic assignment problems, and the like have a 2-Way 1-hot constraint.

Examples of the related art include Japanese Laid-open Patent Publication No. 2016-51349 and Japanese Laid-open Patent Publication No. 2018-41351.

SUMMARY

According to an aspect of the embodiments, provided is an optimization method implemented by an optimization apparatus. In an example, the optimization method includes: accessing first storage configured to store a first weight coefficient group which is at least some of a plurality of weight coefficients indicative of a magnitude of interaction between a plurality of state variables included in an evaluation function that represents energy of an Ising model; accessing a plurality of second storages, the each of the plurality of second storages being configured to store a second weight coefficient group related to a state variable having a value of 1 in any of a plurality of state variable groups respectively including the plurality of state variables among the plurality of weight coefficients; outputting, for each of the plurality of state variable groups, a search result obtained by performing searching processing on a respective state variable group, the searching processing being configured to perform processing of searching for an optimum solution that minimizes the energy by repeatedly performing a first update process or a second update process; and designating the two columns, the two rows, or the group common to the plurality of state variable groups, wherein the first update process includes: obtaining a first determination result by determining, based on an amount of change in the energy of the Ising model calculated using the first weight coefficient group and the second weight coefficient group, whether to replace values of first state variables included in designated two columns or two rows between the two columns or between the two rows in a matrix that the N2 (N is an integer 2 or more) first state variables among the plurality of state variables are arranged in N rows and N columns; and in accordance with the first determination result, performing updating by replacing the first state variables included in the designated two columns or two rows while satisfying a first constraint that a sum of values of first state variables included in each column and each row of the matrix is 1, wherein the second update process includes: obtaining a second determination result by determining, based on the amount of change in the energy, whether to perform update any two values among values of a plurality of second state variables included in a designated group among the plurality of state variables while satisfying a second constraint that a sum of values of the second state variables included in the designated group is 1; and in accordance with the second determination result, performing updating of the two values while satisfying a second constraint that a sum of the plurality of second state variables included in the designated group is 1.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a processing example for a problem having a 2-Way 1-hot constraint;

DESCRIPTION OF EMBODIMENTS

As described above, in a case where the number of state variables that change at one time is one, the optimization apparatus searches for the ground state in which the energy is minimized while repeating the state transition of Hamming distance=1. For this reason, in the optimization apparatus in the related art, transition to a state not satisfying the 1-hot constraint also occurs, and the number (search space) of states in which the transition may occur is larger than the number of states satisfying the 1-hot constraint.

It is possible to narrow the search space by excluding the search for the state other than the state satisfying the 1-hot constraint, but there are a plurality of state variables that change at one time in this case, and there is a problem that the hardware for calculating the energy change is complicated.

In an aspect, an object of the present disclosure is to provide an optimization apparatus and an optimization method capable of calculating a problem including a 1-hot constraint while suppressing hardware complexity.

Hereinafter, embodiments of the present disclosure are described with reference to the drawings.

First Embodiment

Figure 1:
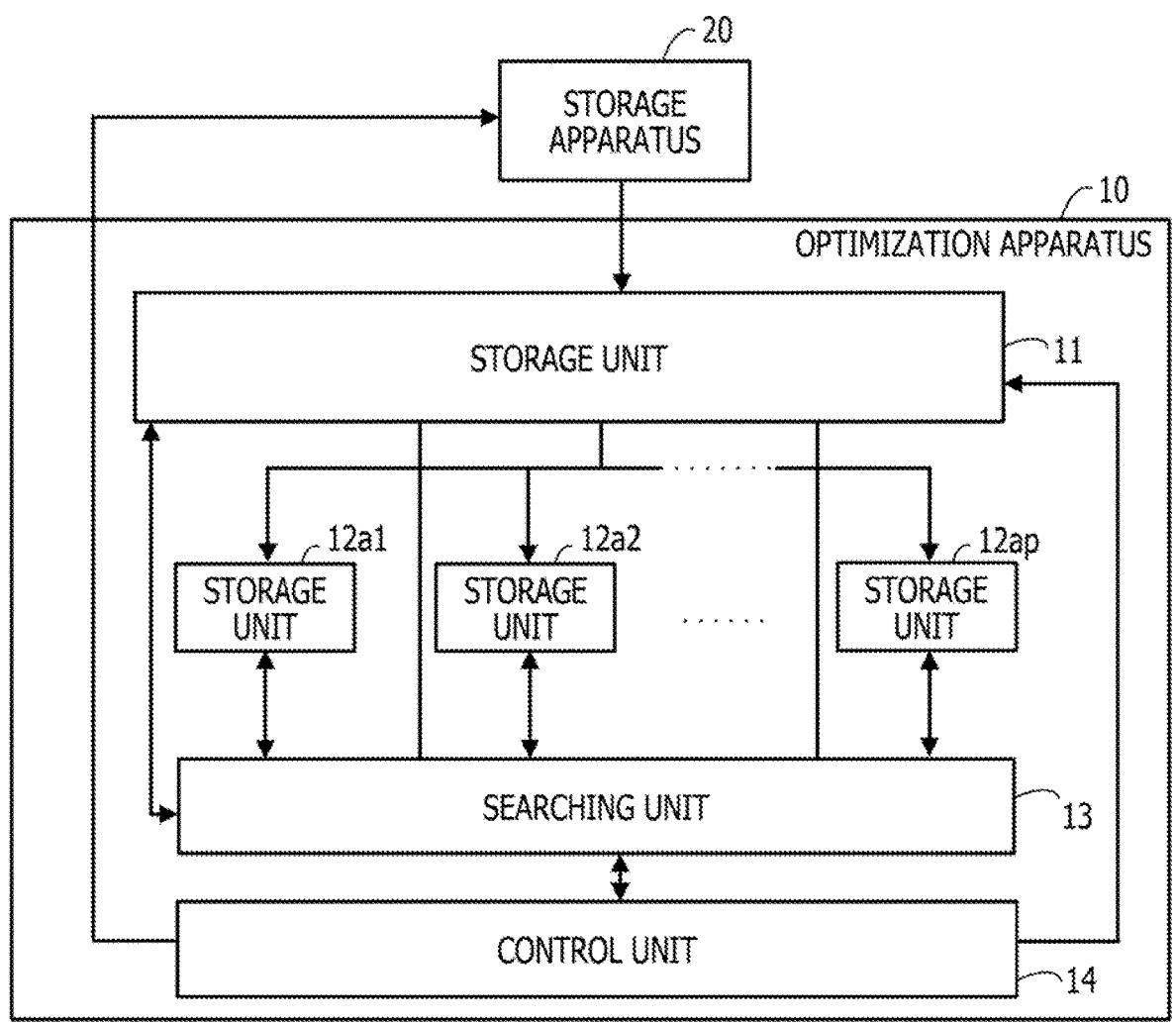
FIG. 1 illustrates an example of an optimization apparatus according to a first embodiment.

FIG. 1 is a diagram illustrating an example of an optimization apparatus according to a first embodiment.

An optimization apparatus 10 searches for an optimum solution that minimizes the energy of the Ising model.

The energy of the Ising model is defined by, for example, an evaluation function E(x) as represented by the following Equation (1).

$$E(x) = -\sum_{(i,j)} W_{ij} x_i x_j - \sum_{i=1} b_i x_i + c \quad (1)$$

The first term on the right side adds up the products of two state variable values and a weight coefficient without missing and overlapping for all combinations of two state variables selectable from all state variables included in the Ising model. $x_i$ is the ith state variable. $x_j$ is the jth state variable. $W_{ij}$ is a weight coefficient indicating a weight (for example, strength of coupling) between the ith state variable and the jth state variable. $W_{ii}=0$. The relation $W_{ij}=W_{ji}$ is often satisfied (for example, the coefficient matrix by a weight coefficient is often a symmetric matrix).

The second term on the right side is a sum of products of bias coefficients of all state variables and values of the state variables. $b_i$ represents a bias coefficient for the ith state variable. c is an invariable.

For example, "−1" of a spin in the Ising model corresponds to a value "0" of the state variable. "+1" of the spin in the Ising model corresponds to a value "1" of the state variable. Hence, the state variable may be called "bit" having a value of 0 or 1.

The combination of the values of the state variables that minimizes a value of Equation (1) is a solution (optimum solution) of the problem.

The optimization apparatus 10 according to the first embodiment includes a storage unit 11, a plurality (p) of storage units 12a1, 12a2, ..., 12ap, a searching unit 13, and a control unit 14.

The storage unit 11 stores a weight coefficient group that is at least a part of a plurality of weight coefficients indicating the magnitude of interaction between a plurality of state variables. In a case where the storage unit 11 has a storage capacity capable of holding all the weight coefficients in Equation (1), all the weight coefficients may be stored. As an example of the storage unit 11, a static random-access memory (SRAM) or the like having an access speed higher than that of a dynamic random-access memory (DRAM) or the like may be used.

Each of the storage units 12a1 to 12ap stores a weight coefficient group related to a state variable having a value of 1 in each of a plurality of state variable groups (replicas) including all state variables among the weight coefficients included in Equation (1). Which state variable has a value of 1 is independent for every replica.

Each of the storage units 12a1 to 12ap may hold the values of all the state variable groups and local fields described later, but these may be held in a register in the searching unit 13.

As an example of the storage units 12al to 12ap, an SRAM or the like may be used. The storage units 12a1 to 12ap may be a plurality of storage regions of one storage apparatus (SRAM or the like).

The searching unit 13 performs search processing for an optimum solution that minimizes energy for each replica.

The searching unit 13 performs processing of searching for the optimum solution that minimizes the energy of the Ising model by repeating update processing of updating the state variables while satisfying the 1-Way 1-hot constraint or the 2-Way 1-hot constraint and outputting the search result for every replica.

In a case where the update processing is performed while the 1-Way 1-hot constraint is satisfied, a group common to all the replicas is designated to the searching unit 13 by the control unit 14. The searching unit 13 determines whether or not to update any two values among the values of the plurality of state variables included in the group based on the energy change calculated using the weight coefficient groups stored in the storage unit 11 and the storage units 12a1 to 12ap. In order to satisfy the 1-Way 1-hot constraint, only one state variable having a value of 0 is updated to 1 in a case where a state variable having a value of 1 among the state variables included in the group is updated to 0.

Figure 2:
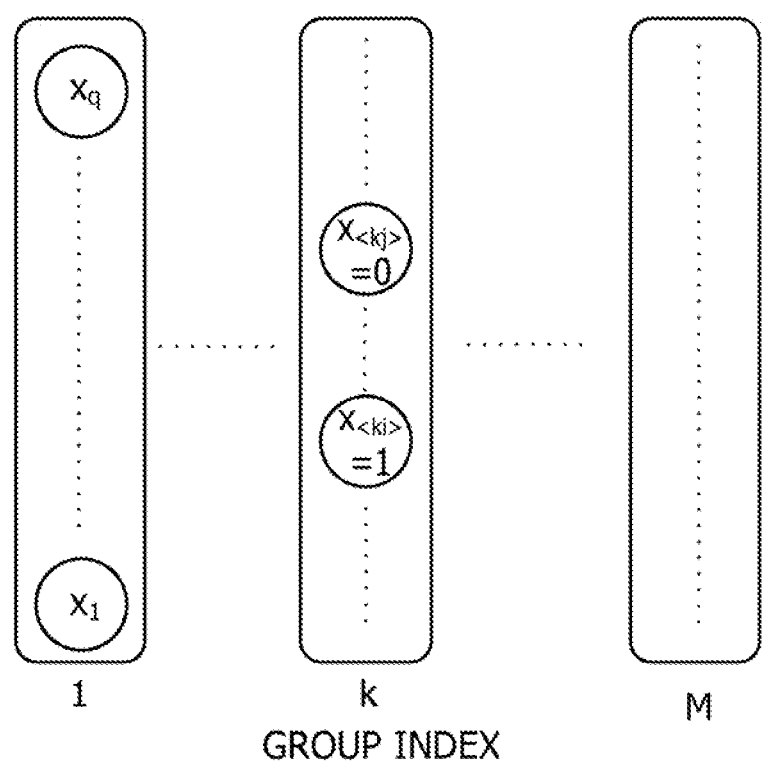
FIG. 2 illustrates an example of a 1-Way 1-hot constraint.

FIG. 2 is a diagram illustrating an example of the 1-Way 1-hot constraint.

In the example of FIG. 2, M groups each having the 1-Way 1-hot constraint are provided. Each group has q state variables. For example, in a case where a group with group index=k is designated by the control unit 14, the searching unit 13 performs update processing for the group with group index=k for all the replicas. In the example of FIG. 2, $x_{<ki>}$ in the group with group index=k is 1, and other state variables (for example, $x_{<kj>}$) are 0. i and j indicate indices of the state variables in the group, and <ki>=(k−1)q+i. Even when the state variables belong to the same group, which state variable is 1 or 0 is independent for every replica.

In Equation (1), when a value of $x_i$ changes to $1-x_i$, an increment of $x_i$ is represented as $\Delta x_i=(1-x_i)-x_i=1-2x_i$. An energy change ($\Delta E_i$) due to the change in this value is represented by the following Equation (2).

$$\Delta E_i = E(x)|_{x_i \to 1-x_i} - E(x) = -\Delta x_i \left( \sum_j W_{ij} x_j + b_i \right) = -\Delta x_i h_i \quad (2)$$

In Equation (2), $\Delta x_i$ becomes $-1$ when $x_i$ changes from 1 to 0, and $\Delta x_i$ becomes 1 when $x_i$ changes from 0 to 1. $h_i$ is called a local field, and the product of $h_i$ by a sign (+1 or −1) according to $\Delta x_i$ is $\Delta E_i$.

A change in $h_i$ when $x_j$ changes from 0 to 1 is $\Delta h_i^{(j)}=+W_{ij}$, and a change in $h_i$ when $x_j$ changes from 1 to 0 is $\Delta h_i^{(j)}=-W_{ij}$. Similarly, a change in $h_j$ for $x_j$ when $x_i$ changes may be represented as $\Delta h_j^{(i)}=\Delta x_i W_{ij}$.

Therefore, an energy change when both of $x_i$ and $x_j$ change may be represented by the following Equation (3).

$$\Delta E_{ij}=-\Delta x_i h_i-\Delta x_j(h_j+\Delta x_i W_{ij})=-\Delta x_i h_i-\Delta x_j h_j-\Delta x_i \Delta x_j W_{ij} \quad (3)$$

As described above, in order to transition from one state satisfying the 1-Way 1-hot constraint to another state satisfying the constraint, the values of two state variables are changed. When an energy change in a case where $x_i$ changes from 1 to 0 and $x_j$ changes from 0 to 1 is expressed as $\Delta E_j$, $\Delta x_i=-1$ and $\Delta x_j=1$, and thus $\Delta E_j$ may be represented by the following Equation (4) from Equation (3).

$$\Delta E_j=h_i-h_j+W_{ij} \quad (4)$$

$W_{ij}x_ix_j$ does not participate in energy if either $x_i$ or $x_j$ is 0 in Equation (1), and thus $W_{ij}$ in Equation (4) may not be provided.

From the above, in the example of FIG. 2, when an energy change when $x_{<ki>}$ changes from 1 to 0 and $x_{<kj>}$ changes from 0 to 1 is expressed as $\Delta E_k$, $\Delta E_k$ may be represented by the following Equation (5) from Equation (4).

$$\Delta E_k=h_{<ki>}-h_{<kj>} \quad (5)$$

In each replica, the searching unit 13 calculates an energy change as described above for each state variable having a value of 0 among the plurality of state variables included in the designated group.

In each replica, based on the calculated energy change, the searching unit 13 determines whether or not to accept a change in the state variable that causes the energy change by a simulated annealing method, a replica exchange method, or the like. The searching unit 13 preferentially accepts a change in the state variable that decreases E(x) in Equation (1) but stochastically allows a change that increases E(x).

In a case where a state variable whose value is to be updated from 0 to 1 in a group is determined, the searching unit 13 updates the value of the state variable from 0 to 1 and updates the value of a state variable whose current value is 1 in the group from 1 to 0. The searching unit 13 updates the local field.

For example, when $x_{<ki>}$ in FIG. 2 changes from 1 to 0 and $x_{<kj>}$ changes from 0 to 1 for a certain replica, the local fields ($h_1$ to $h_N$) for all n state variables ($x_1$ to $x_n$) are updated based on the following Equation (6).

$$\frac{(h_1, h_2, \ldots, h_n) - (W_{1<ki>}, W_{2<ki>}, \ldots, W_{n<ki>}) + (W_{1<kj>}, W_{2<kj>}, \ldots, W_{n<kj>})}{(h_1, h_2, \ldots, h_n)} \quad (6)$$

Among the weight coefficients included in Equation (6), $W_{1<ki>}$ to $W_{n<ki>}$ are weight coefficient groups related to $x_{<ki>}$ whose value before update is 1 and thus are stored in any of the storage units 12a1 to 12ap. $W_{1<kj>}$ to $W_{n<kj>}$ are stored in the storage unit 11 in advance. Hence, these weight coefficient groups are read from the storage unit 11 and any of the storage units 12a1 to 12ap and used.

The searching unit 13 reads a weight coefficient group related to the state variable whose value has been updated from 0 to 1 from the storage unit 11 and causes the weight coefficient group to be stored in the storage units 12a1 to 12ap.

In a case where the update processing is performed while the 2-Way 1-hot constraint is satisfied, two columns or two rows common to all the replicas are designated to the searching unit 13 by the control unit 14. The searching unit 13 determines whether or not to replace the values of the state variables included in the designated two columns or two rows between the two columns or between the two rows based on the weight coefficient groups stored in the storage unit 11 and the storage units 12a1 to 12ap. In a case where the 2-Way 1-hot constraint is satisfied, the value of one among the plurality of state variables included in each column and each row is 1. Hence, even when the values of the state variables included in two columns or two rows are replaced, the constraint is satisfied.

Figure 3:
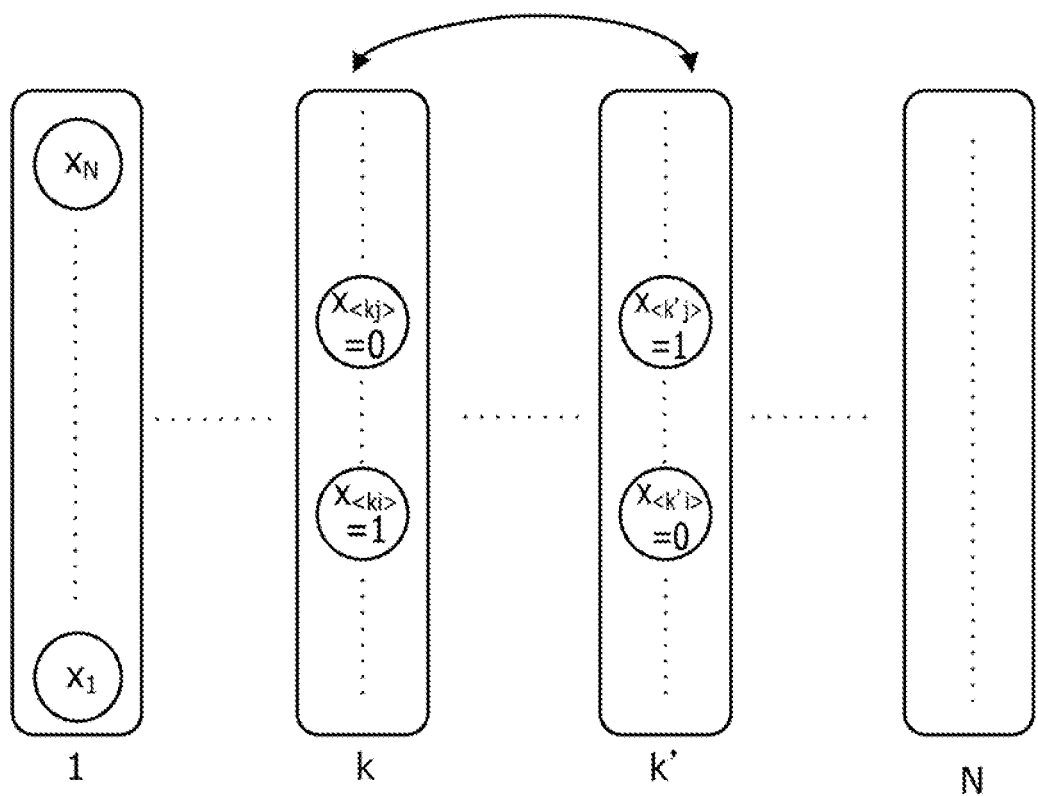
FIG. 3 illustrates an example of a 2-Way 1-hot constraint.

FIG. 3 is a diagram illustrating an example of the 2-Way 1-hot constraint.

In the example of FIG. 3, state variables arranged in N rows and N columns (N is an integer 2 or more) having the 2-Way 1-hot constraint are illustrated. For example, in a case where a column k and a column k' are designated by the control unit 14, the searching unit 13 performs update processing for the state variables included in the column k and the column k' for both replicas.

In the example of FIG. 3, $x_{<ki>}$ that is the state variable of a row i of a column k is 1 and other state variables (for example, $x_{<kj>}$ that is the state variable of a row j) of the column k are 0. $x_{<k'j>}$ that is the state variable of a row j of a column k' is 1, and other state variables (for example, $x_{<k'i>}$ that is the state variable of a row i) in the column k are 0. Even when the state variables belong to the same column, the state variable of which row is 1 or 0 is independent for every replica.

In the case of FIG. 3, to replace the values of the state variables included in the column k and the column kW is the same as to change $x_{<kj>}$ and $x_{<k'i>}$ from 0 to 1 and to change $x_{<k'j>}$ and $x_{<k'j>}$ from 1 to 0.

When the energy change when four state variables are changed in this manner is expressed as $\Delta E_{kk'}$, $\Delta E_{kk'}$ may be represented by the following Equation (7).

$$\Delta E_{kk'}=(h_{<ki>}+h_{<k'j>}-h_{<kj>}-h_{<k'i>})-(W_{<ki><k'j>}+W_{<kj><k'i>}) \quad (7)$$

The searching unit 13 may calculate the energy change as described above one time for the column k and the column k' designated in each replica.

Based on the calculated energy change, the searching unit 13 determines whether or not to accept (whether or not to perform replacement) the change in the state variable that causes the energy change by a simulated annealing method, a replica exchange method, or the like. The searching unit 13 preferentially accepts a change in the state variable that decreases E(x) in Equation (1) but stochastically allows a change that increases E(x). For example, in a case where $\Delta E_{kk'}$ is a positive value as well, replacement of the values of the state variables included in the column k and the column k' is stochastically allowed.

For example, in a case where replacement of the values of the state variables included in the column k and the column k' is allowed for a certain replica, $x_{<kj>}$ and $x_{<k'i>}$ are changed from 0 to 1 and $x_{<ki>}$ and $x_{<k'j>}$ are changed from 1 to 0. The searching unit 13 updates the local field.

In a case where $x_{<kj>}$ and $x_{<k'i>}$ are changed from 0 to 1 and $x_{<ki>}$ and $x_{<k'j>}$ are changed from 1 to 0, the local fields ($h_1$ to $h_n$) for all n state variables ($x_1$ to $x_n$) are updated based on the following Equation (8).

$$(h_1, h_2, \ldots, h_n) - (W_{1<ki>}, W_{2<ki>}, \ldots, W_{n<ki>}) + \\ (W_{1<kj>}, W_{2<kj>}, \ldots, W_{n<kj>}) + (W_{1<k'i>}, W_{2<k'i>}, \ldots, W_{n<k'i>}) - \\ (W_{1<k'j>}, W_{2<k'j>}, \ldots, W_{n<k'j>}) \\ \overline{(h_1, h_2, \ldots, h_n)} \quad (8)$$

Among the weight coefficients included in Equation (8), $W_{1<ki>}$ to $W_{n<ki>}$ and $W_{1<kj>}$ to $W_{n<kj>}$ are weight coefficient groups related to $x_{<ki>}$ and $x_{<kj>}$ whose values before update are 1 and thus are stored in any of the storage units 12a1 to 12ap. $W_{1<ki>}$ to $W_{n<ki>}$ and $W_{1<kj>}$ to $W_{n<kj>}$ are stored in the storage unit 11 in advance. Hence, these weight coefficient groups are read from the storage unit 11 and any of the storage units 12a1 to 12ap and used.

Similar processing to the above is performed for the column k and the column k' in other replicas as well. Similar processing is performed in a case where replacement between two rows is performed as well.

The searching unit 13 reads a weight coefficient group related to the state variable whose value has been updated from 0 to 1 from the storage unit 11 and causes the weight coefficient group to be stored in the storage units 12a1 to 12ap.

The searching unit 13 repeats processing as described above by changing the group and column or row to be designated until a search end condition (for example, whether a predetermined number of repetitions ends) is satisfied. The searching unit 13 outputs, for example, the values of all the state variables when the search end condition is satisfied for each replica to the control unit 14.

The searching unit 13 may perform processing for each replica in parallel or may operate in a pipeline manner.

The searching unit 13 may be implemented by, for example, an application-specific electronic circuit, such as an application-specific integrated circuit (ASIC) or a field-programmable gate array (FPGA), which includes an adding and subtracting circuit, a selector, and the like and is for calculating Equations (5) to (8).

The control unit 14 designates a group, two columns, or two rows to be processed by the searching unit 13. These are a group, two columns, or two rows common to all replicas. The control unit 14 designates a group, two columns, or two rows to be processed in a predetermined order. For example, the control unit 14 designates a group to be processed in an ascending order of group index. For example, the control unit 14 designates two columns to be processed by the searching unit 13 as a column 1 and a column 2, a column 1 and a column 3, ..., a column 1 and a column N, a column 2 and a column 3, a column 3 and a column 4, ....

In a case where the storage unit 11 does not hold all the weight coefficients in Equation (1) by the limitation of the storage capacity or the like, the control unit 14 reads a part of the weight coefficient group from the storage apparatus 20 and stores the part in the storage unit 11. The storage apparatus is, for example, a DRAM or high bandwidth memory (HBM).

The control unit 14 sets various parameters used in update processing such as temperature parameters used in the simulated annealing method or the replica exchange method, initial values of the respective state variables, and the like in the searching unit 13. The initial values of the respective state variables are set so as to satisfy the 1-Way 1-hot constraint or the 2-Way 1-hot constraint.

For example, the control unit 14 receives the values (search results) of all the state variables when the search end condition is satisfied in the searching unit 13 and calculates the energy for every replica based on Equation (1). The control unit 14 outputs, for example, the search results (values of all state variables) in the replica indicating the lowest energy as a solution of the problem to a display device (not illustrated) or the like coupled to the control unit 14. For example, the control unit 14 may transmit the search result to an external information processing apparatus via a wired or wireless network.

The searching unit 13 may calculate the energy for every replica based on the energy change due to the update of state variable.

The control unit 14 may be implemented by, for example, an application-specific electronic circuit such as an ASIC or an FPGA. The control unit 14 is not limited to this and may be a processor such as a central processing unit (CPU) or a graphics processing unit (GPU).

Hereinafter, a processing example (an example of an optimization method) by the optimization apparatus 10 when a problem having a 2-Way 1-hot constraint is solved will be described.

Figure 4:
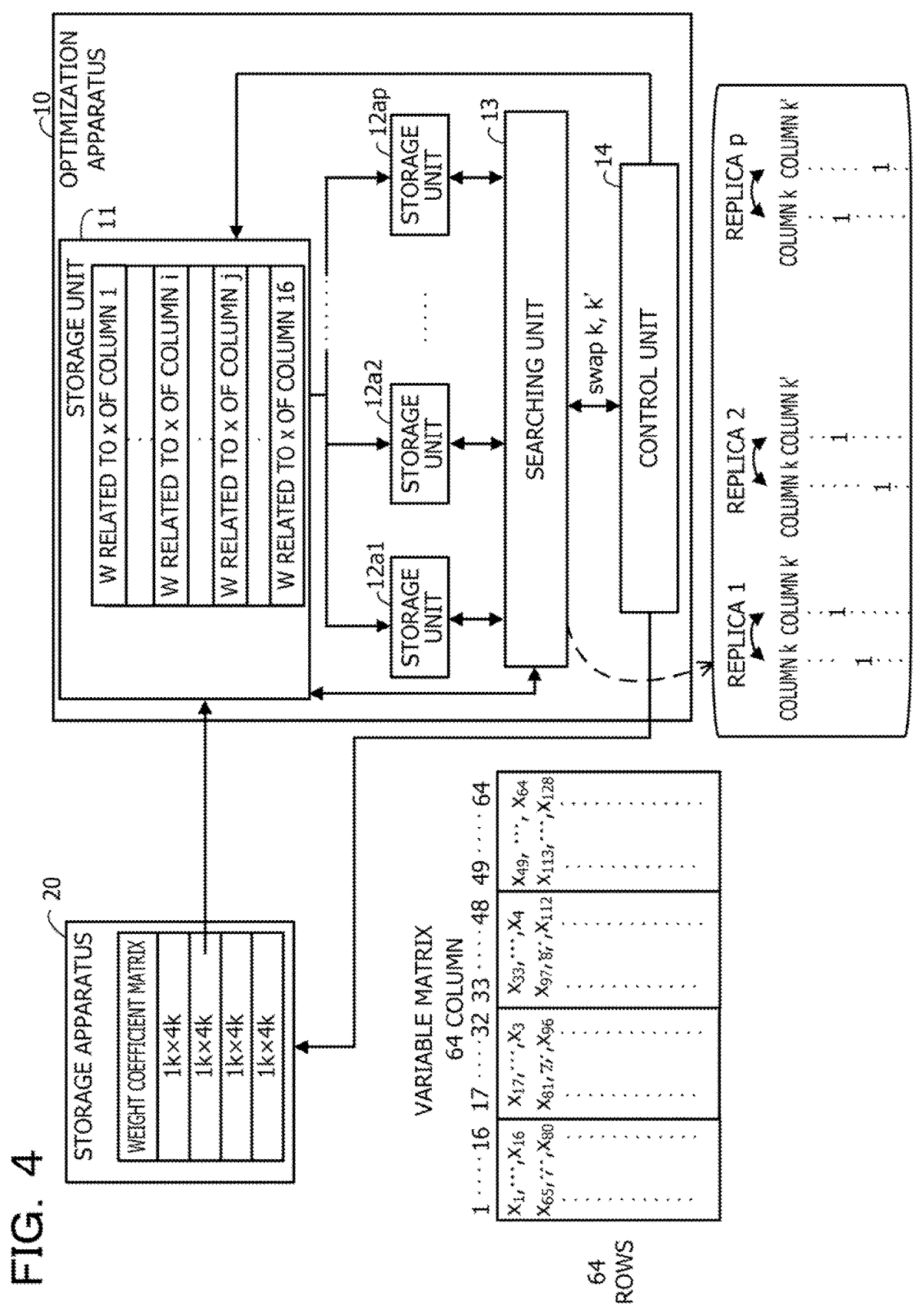

FIG. 4 is a diagram illustrating a processing example for a problem having a 2-Way 1-hot constraint.

In the example of FIG. 4, it is assumed that the size of the problem that is the calculation target and has a 2-Way 1-hot constraint is 4k (the total number of state variables is 4096). FIG. 4 illustrates an example of a variable matrix in which 4096 state variables are arranged in 64 rows and 64 columns. One row of the weight coefficient matrix is 4k words. When the storage capacity of the storage unit 11 is 2k variables (the number of state variables is 2048), the size of the weight coefficient matrix that may be held is 2k×2k words. 2k×2k may be represented as 64×16 (=1k)×4k, and thus the weight coefficients of the number corresponding to sixteen columns of the variable matrix may be stored in the storage unit 11.

The control unit 14 sets various parameters and initial values of state variables satisfying the 2-Way 1-hot constraint in the searching unit 13. The control unit 14 reads the weight coefficient related to a state variable having a value of 1 from the storage apparatus 20 based on the initial values of the state variables and causes the weight coefficient to be stored in the storage units 12a1 to 12ap via the storage unit 11 (the weight coefficient may be stored directly in the storage units 12a1 to 12ap from the storage apparatus 20).

The control unit 14 may calculate the initial value of the local field ($h_i$) in Equation (2) based on the initial value of the state variable, the weight coefficient, and the bias coefficient for every replica and write the initial value in the storage units 12a1 to 12ap or a register (not illustrated) of the searching unit 13. The initial value of the local field may be calculated by the searching unit 13. In a case where the searching unit 13 calculates the initial value of the local field, for example, the searching unit 13 receives the bias coefficient from the control unit 14, reads the weight coefficients stored in the storage units 12a1 to 12a*p*, and calculates the initial value of the local field.

For example, the control unit 14 reads a weight coefficient group (the first 1k rows (rows 1 to 1024) of the weight coefficient matrix) related to the state variables of the column 1 to column 16 of the variable matrix among the weight coefficient matrixes stored in the storage apparatus 20 and causes the weight coefficient group to be stored in the storage unit 11.

The control unit 14 designates two columns to be processed among the column 1 to column 16 to the searching unit 13. "swap k, k'" in the example of FIG. 4 indicates that a column k and a column k' are designated for the respective replicas 1 to p. In this case, in each of the replicas 1 to p, the searching unit 13 calculates the energy change due to the occurrence of replacement between the column k and the column k' based on Equation (7) and determines whether or not the replacement is possible based on the energy change. In a case where the replacement is allowed, the values of four state variables are updated. In this case, the local field is updated based on Equation (8).

There are $_{16}C_2$(=120) combinations for selecting two columns from among sixteen columns, and thus, for example, 120 trials are performed. For example, as described above, two columns to be processed by the searching unit 13 are designated as a column 1 and a column 2, a column 1 and a column 3, . . . , a column 1 and a column 16, a column 2 and a column 3, a column 3 and a column 4, . . . , and the like.

For example, the control unit 14 causes the weight coefficient group related to the state variables of the next sixteen columns among the weight coefficient matrixes stored in the storage apparatus 20 to be read, causes the weight coefficient group to be stored (to be overwritten) in the storage unit 11, and performs the same processing as described above. The state variables in the subsequent sixteen columns are also processed in the same manner.

In a case where a weight coefficient group related to the state variables of sixteen columns are read at all times, there is a possibility that a combination of columns in which replacement is not easily allowed may be generated. For example, it is effective that the control unit 14 combines a plurality of reading methods as described below.

Figure 5:
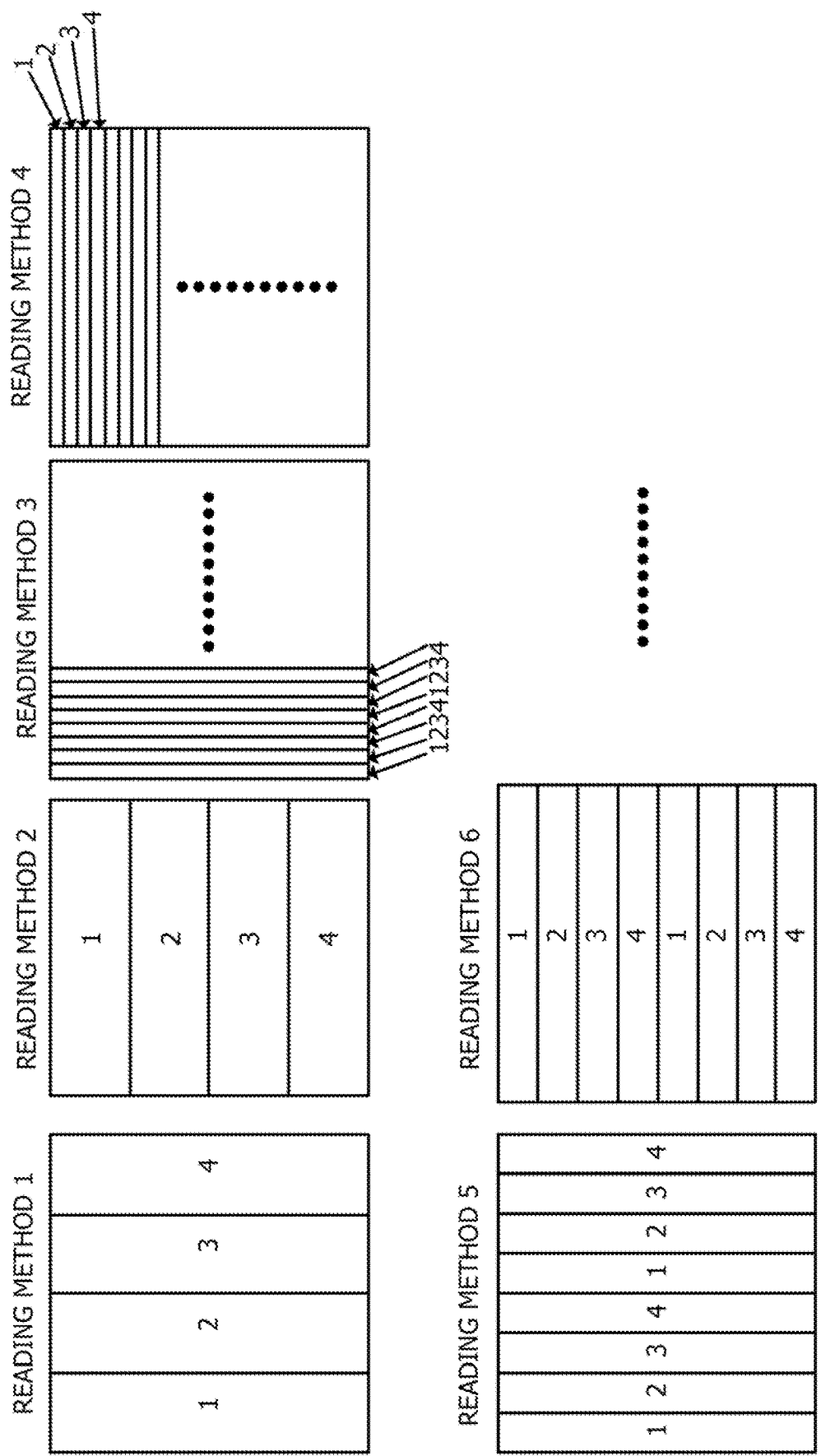
FIG. 5 illustrates an example of a plurality of reading methods.

FIG. 5 is a diagram illustrating an example of a plurality of reading methods.

A reading method 1 is, for example, a method of selecting the state variables of 64 columns by sixteen columns at a time and reading the weight coefficient group related to the state variables of the sixteen columns from the storage apparatus 20. A reading method 2 is, for example, a method of selecting the state variables of 64 rows by 16 rows at a time and reading the weight coefficient group related to the state variables of the 16 rows from the storage apparatus 20. A reading method 3 is, for example, a method of selecting the state variables of 64 columns by four columns at a time and reading the weight coefficient group related to the state variables of the four columns from the storage apparatus 20. A reading method 4 is, for example, a method of selecting the state variables of 64 rows by four rows at a time and reading the weight coefficient group related to the state variables of the four rows from the storage apparatus 20. A reading method 5 is, for example, a method of selecting the state variables of 64 columns by eight columns at a time and reading the weight coefficient group related to the state variables of the eight columns from the storage apparatus 20. A reading method 6 is, for example, a method of selecting the state variables of 64 rows by eight rows at a time and reading the weight coefficient group related to the state variables of the eight rows from the storage apparatus 20.

For example, the control unit 14 combines a plurality of reading methods such that reading is performed by the reading method 2 after reading by the reading method 1 ends and reading is performed by the reading method 3 after reading by the reading method 2 ends.

Figure 6:
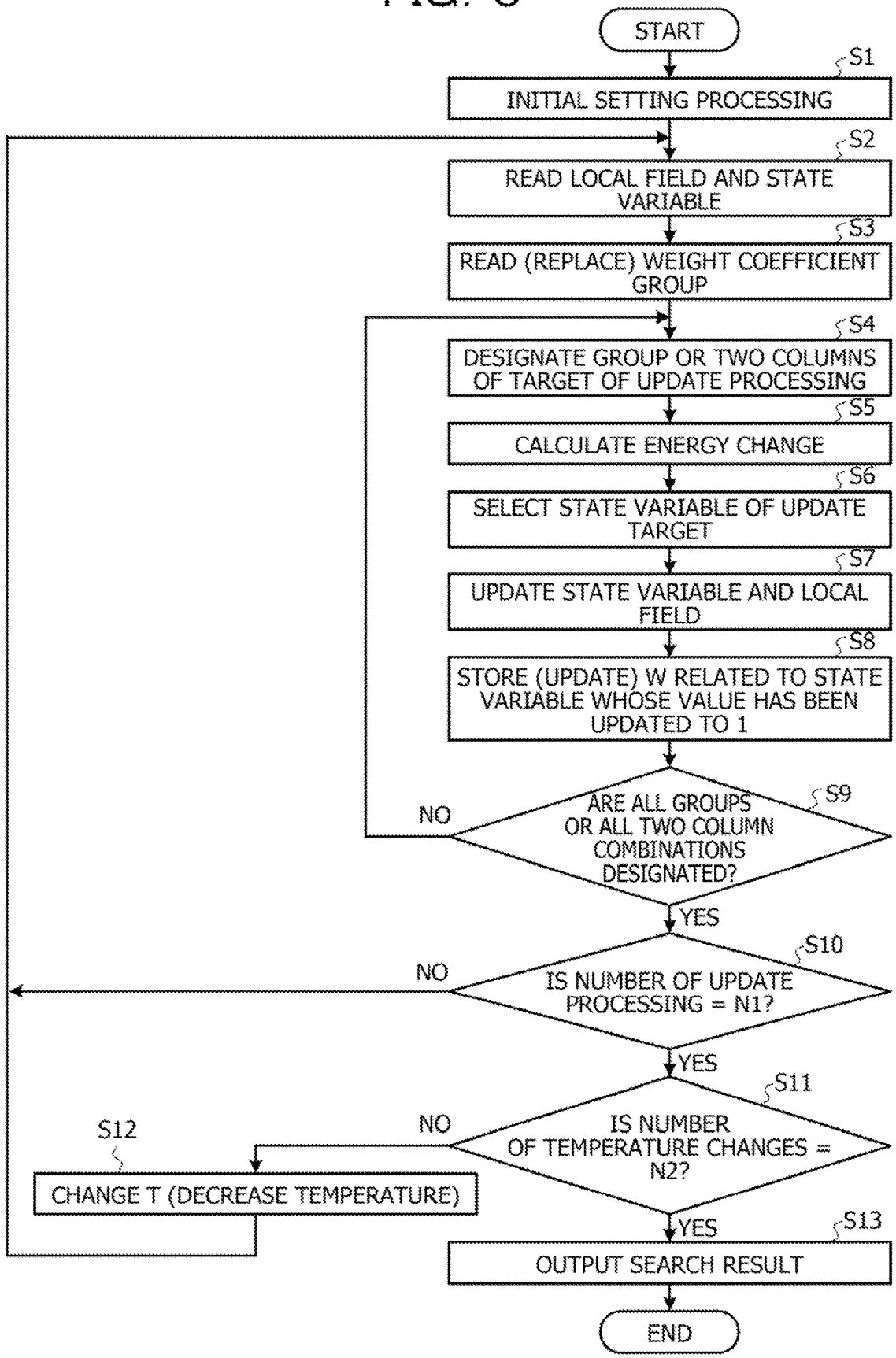
FIG. 6 is a flowchart illustrating the flow of an example of processing by an optimization apparatus according to a first embodiment.

Hereinafter, the flow of an example of processing by the optimization apparatus 10 according to the first embodiment is summarized in a flowchart, FIG. 6 is a flowchart illustrating the flow of an example of processing by the optimization apparatus according to the first embodiment.

First, initial setting processing is performed (step S1). In the initial setting processing, the control unit 14 sets various parameters used in the update processing such as temperature parameters used in the simulated annealing method or the replica exchange method, initial values of the respective state variables, and the like in the searching unit 13. In the following description, it is assumed that the searching unit 13 performs the search processing by the simulated annealing method on the respective replicas in parallel. The control unit 14 calculates the initial value of the local field (h) in Equation (2) based on the initial value of the state variable, the weight coefficient, and the bias coefficient and writes the initial value in the storage units 12a1 to 12a*p* or a register (not illustrated) of the searching unit 13. The control unit 14 reads the weight coefficient related to the state variable having a value of 1 from the storage apparatus 20 based on the initial values of the state variables and causes the weight coefficient to be stored in the storage units 12a1 to 12a*p*.

The searching unit 13 reads the held local field and the state variable (step S2).

The control unit 14 reads a weight coefficient group which is a part of the plurality of weight coefficients stored in the storage apparatus 20 and causes the weight coefficient group to be stored in the storage unit 11 (step S3). In the second and subsequent processing in step S3, the weight coefficient group stored in the storage unit 11 is replaced with another weight coefficient group. After the processing in step S3, the control unit 14 designates a group or two columns (may be two rows, the same applies hereinafter) of the update processing target to the searching unit 13 (step S4).

The searching unit 13 calculates an energy change (step S5). In a case where the update processing is performed for each replica while the 2-Way 1-hot constraint is satisfied, the searching unit 13 calculates the energy change due to replacement (changes in the values of four state variables) of the designated two columns by, for example, Equation (7). In a case where the update processing is performed while the 1-Way 1-hot constraint is satisfied, the searching unit 13 calculates the energy change due to a change in the values of two state variables (one among the state variables having a value of 0 and the state variable having a value of 1) in the designated group by, for example, Equation (5) for each of the state variables having a value of 0.

The searching unit 13 selects a state variable of the update target based on the calculated energy change and the temperature parameter (step 56). The searching unit 13 preferentially adopts the change in the state variable that causes an energy change that decreases the energy as well as stochastically allows the change in the state variable that causes an energy change that increases the energy based on the temperature parameter. The allowable probability of an energy change that more greatly increases the energy increases as the temperature parameter is greater, and the probability decreases as the temperature parameter is smaller.

The searching unit 13 updates the value of the selected state variable and updates the local field (step S7). The update of the local field is performed, for example, as in Equation (6) or Equation (8) described above. The updated state variable and local field are written in a register (not illustrated).

The searching unit 13 causes the weight coefficient group related to the state variable whose value has been updated from 0 to 1 to be read from the storage unit 11 and stored in the storage units 12a1 to 12ap (step S8). For example, the weight coefficient group stored in the storage units 12a1 to 12ap is updated.

The control unit 14 determines whether or not all groups or all two column combinations have been designated in the range of the weight coefficient group read from the storage apparatus 20 (step S9). For example, as illustrated in FIG. 4, in a case where the weight coefficient group related to the state variables of the column 1 to column 16 of the variable matrix is read from the storage apparatus 20 and stored in the storage unit 11, the control unit 14 determines whether or not all $_{16}C_2$ (=120) combinations have been designated. In a case where the control unit 14 determines that all groups or all two column combinations are not designated, the processing from step S4 is repeated.

In a case where it is determined that all groups or all two column combinations have been designated, the control unit 14 determines whether or not the number of update processing for each replica in the searching unit 13 reaches a predetermined number N1 (step S10). In a case where the number of update processing does not reach the predetermined number N1, the processing from step S2 is repeated. In this case, in the processing in step S3, another part of weight coefficient group among the plurality of weight coefficients is read from the storage apparatus 20 and stored in the storage unit 11, and the same processing as described above is performed. For example, the target stored as the weight coefficient group in the storage unit 11 is replaced with another weight coefficient group.

In a case where the number of update processing reaches the predetermined number N1, the control unit 14 determines whether or not the number of changes in the temperature parameter (the number of temperature changes) has reached a predetermined number N2 (step S11).

In a case where the number of temperature changes has not reached the predetermined number N2, the control unit 14 changes (decreases the temperature) the temperature parameter (denoted as T in FIG. 6) (step S12). A method of changing values of the predetermined numbers N1 and N2 and T (to what extent the values are decreased at one time or the like) is determined based on an annealing condition. After the processing in step S12, the processing from step S2 is repeated.

When the number of temperature changes has reached the predetermined number N2, for example, the control unit 14 receives the values (search results) of all the state variables held in the register of the searching unit 13 at this time and calculates the energy for every replica based on Equation (1). For example, the control unit 14 outputs the search results (values of all state variables) in the replica indicating the lowest energy as a solution of the problem to a display device or the like (step S13). Thus, the processing by the optimization apparatus 10 ends.

The order of the processing described above is not limited to the example described above and may be switched as appropriate.

The same temperature parameter value is allocated to each replica in the above description, but a different temperature parameter value is allocated to each replica in a case where the replica exchange method is performed. The value of temperature parameter or the value of state variable that is set between the replicas is exchanged at a predetermined exchange probability based on the energy of each replica and the value of temperature parameter for every predetermined number of update processing.

According to the optimization apparatus 10 of the first embodiment as described above, the searching unit 13 may perform the update processing on the designated common two columns, two rows, or group for each replica. Hence, the number of calculations of the energy change decreases (one for one time of designation in the case of a 2-Way 1-hot constraint), and it is possible to calculate a problem including a 1-hot constraint such as a 1-Way 1-hot constraint or a 2-Way 1-hot constraint while suppressing hardware complexity.

As the range in which the update processing is performed is designated as described above, weight coefficients to be stored in the optimization apparatus 10 may be partly omitted. It is thus possible to calculate a problem having a larger scale. Since the update processing is performed in the range using the weight coefficient group stored in the storage unit 11, the optimization apparatus 10 may less frequently access the storage apparatus 20.

By replacing the weight coefficient group stored in the storage unit 11 for every predetermined number of update processing and periodically changing the state variable to be the target of update processing, the difference between the obtained search results may decrease as compared with the case where all the state variables are simultaneously taken as the target of update processing.

Figure 7:
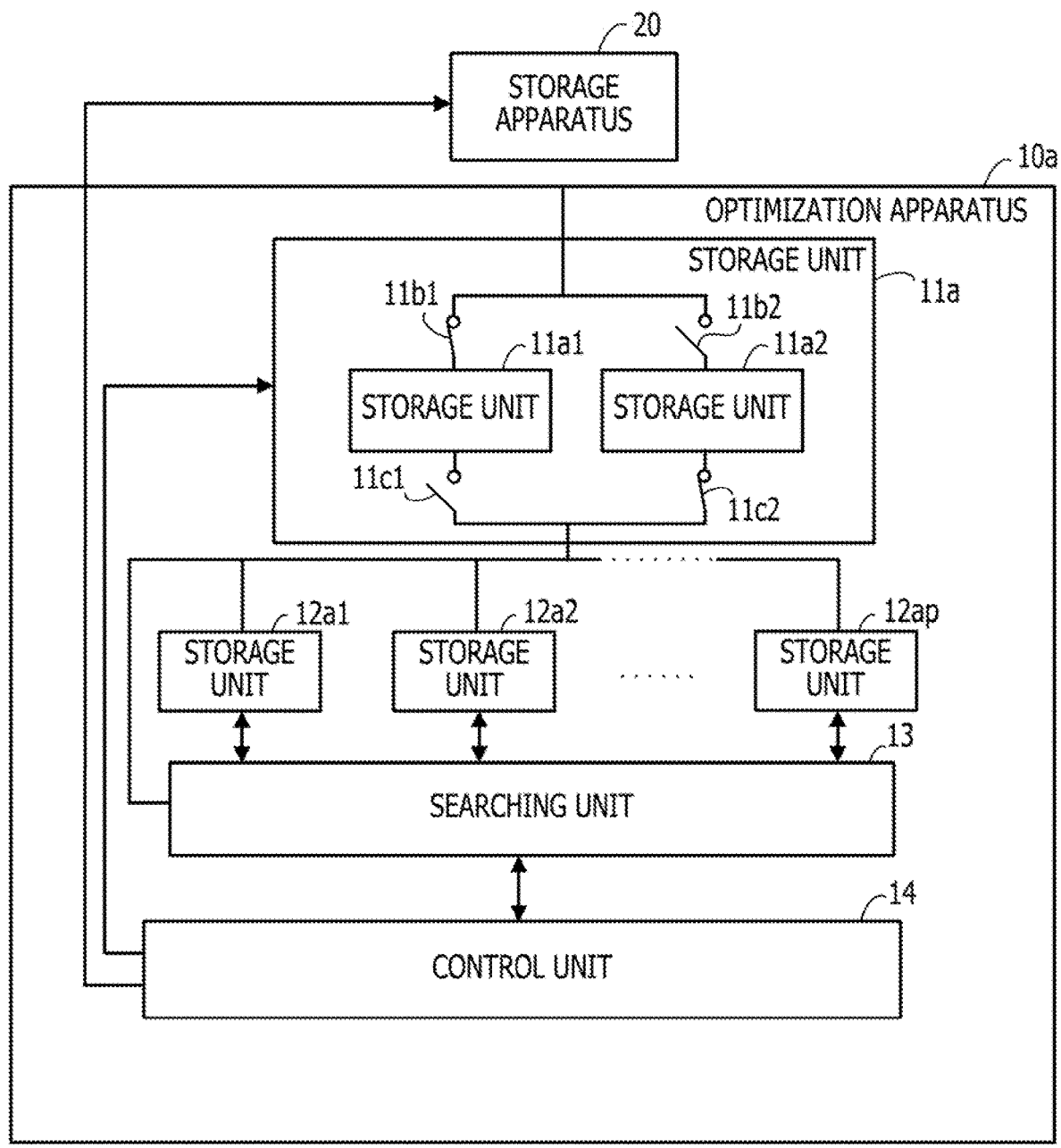
FIG. 7 illustrates a modification example of an optimization apparatus according to a first embodiment.

FIG. 7 is a diagram illustrating a modification example of the optimization apparatus according to the first embodiment. In FIG. 7, the same elements as the elements illustrated in FIG. 1 are assigned with the same reference signs.

A storage unit 11a of an optimization apparatus 10a of the modification example includes two storage units 11a1 and 11a2. For example, an SRAM or the like may be used as each of the storage units 11a1 and 11a2.

The storage unit 11a1 is coupled to the storage apparatus 20 via a switch 11b1, and the storage unit 11a is coupled to the storage apparatus 20 via a switch 11b2. The storage unit 11a1 is coupled to the storage units 12a1 to 12ap via a switch 11c1, and the storage unit 11a2 is coupled to the storage units 12a1 to 12ap via a switch 11c2. On/off of the switches 11b1, 11b2, 11c1, and 11c2 is controlled by the control unit 14.

While the searching unit 13 is executing update processing using the weight coefficient group stored in one of the storage units 11ai and 11a2, the weight coefficient group related to the state variable to be the next target of update processing is read from the storage apparatus 20 and written in the other of the storage units 11al and 11a2.

For example, the control unit 14 turns on the switch 11c2 and turns off the switch 11b2 and causes the searching unit 13 to perform update processing using the weight coefficient group related to the state variables of sixteen columns stored in the storage unit 11a2. At this time, the control unit 14 turns on the switch 11b1 and turns off the switch 11c1 and causes the weight coefficient group related to the state variables of the next sixteen columns to be read from the storage apparatus 20 and stored in the storage unit 11a1.

This may substantially shorten the time taken to read data from the storage apparatus 20 and shorten the calculation time.

Second Embodiment

Figure 8:
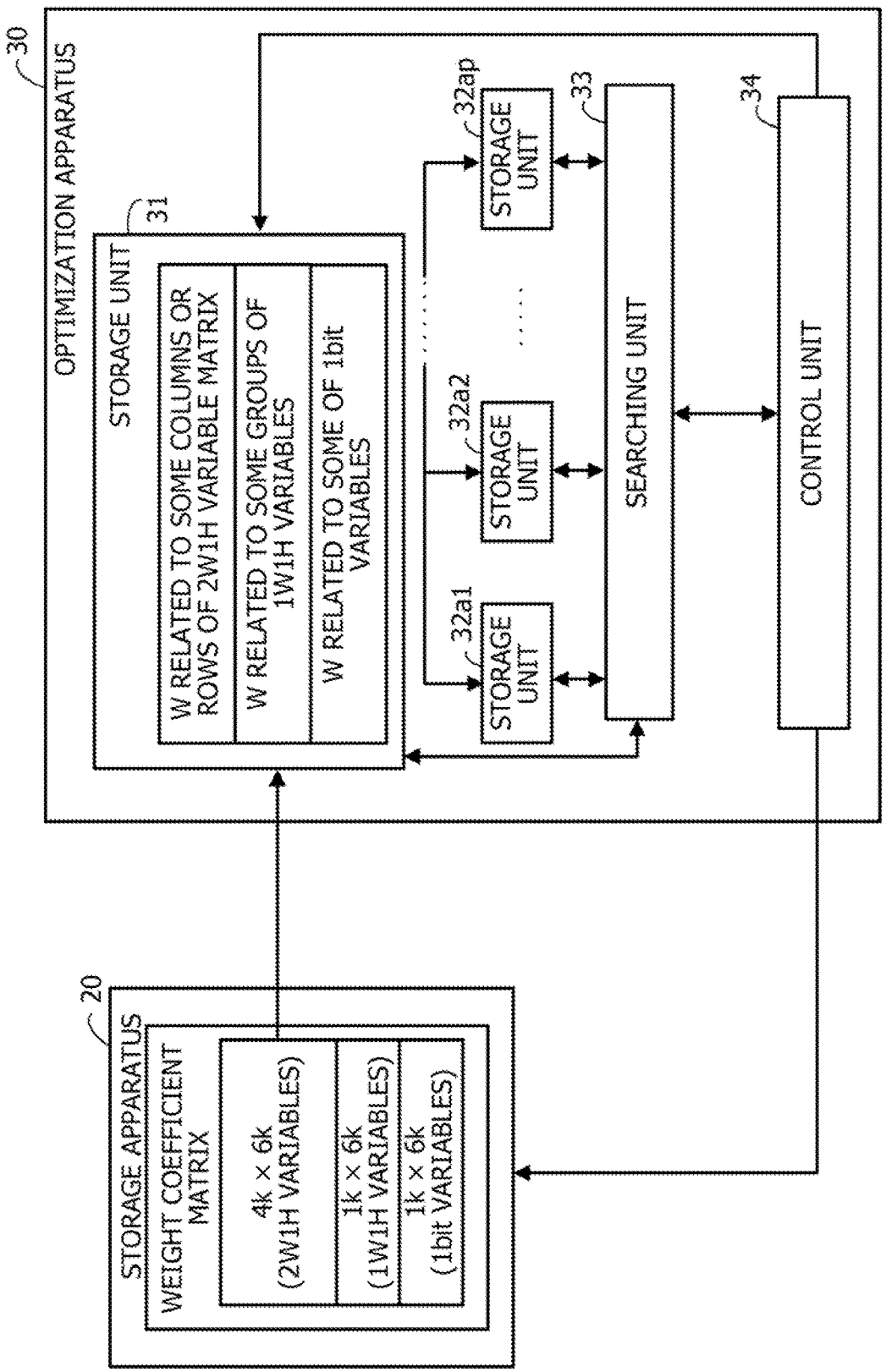
FIG. 8 illustrates an example of an optimization apparatus according to a second embodiment.

FIG. 8 is a diagram illustrating an example of an optimization apparatus according to a second embodiment.

An optimization apparatus 30 according to a second embodiment includes the same elements as those of the optimization apparatus 10 according to the first embodiment, but performs processing in a case where state variables subjected to a 1-hot constraint and state variables not subjected to the 1-hot constraint are mixed in all state variables.

FIG. 8 illustrates an example of a weight coefficient matrix stored in the storage apparatus 20.

The weight coefficient matrix includes weight coefficients related to a state variable subjected to a 2-Way 1-hot constraint (hereinafter, 2W1H variable), a state variable subjected to a 1-Way 1-hot constraint (hereinafter, 1W1H variable), and a state variable not subjected to a 1-hot constraint (hereinafter, 1 bit variable), FIG. 8 illustrates an example of the weight coefficient matrix in a case where the size of the problem of the calculation target is 6k, the number of 2W1H variables is 4k (64×64), the number of 1W1H variables is 1k (64 groups, each group has 16 variables), and the number of 1 bit variables is 1k.

A storage unit 31 of the optimization apparatus 30 stores a weight coefficient group which is at least a part of such a weight coefficient matrix. In the example of FIG. 8, the storage unit 31 holds a weight coefficient group related to some columns or rows of the 2W1H variable matrix, a weight coefficient group related to some groups of the W1H variables, and a weight coefficient group related to some of 1 bit variables. Identification information indicating whether a weight coefficient group is related to the 2W1H variables, the 1W1H variables, or the 1 bit variables may be allocated to each weight coefficient group. As an example of the storage unit 31, an SRAM or the like may be used.

Each of storage units 32a1 to 32ap stores a weight coefficient group related to a state variable having a value of 1 among the 2W1H variables or the 1W1H variables. Which state variable has a value of 1 is independent for every replica. As an example of the storage units 32a1 to 32ap, an SRAM or the like may be used.

A searching unit 33 repeats the update processing of updating the 2W1H variables, the 1W1H variables, or the 1 bit variables while satisfying the 2-Way 1-hot constraint for the 2W1H variables and the 1-Way 1-hot constraint for the 1W1H variables. Accordingly, the searching unit 33 searches for the optimum solution that minimizes the energy of the Ising model and outputs the search result. The searching unit 33 performs such processing for every replica. To the searching unit 33, a control unit 34 designates two columns or two rows common to all the replicas for update processing of the 2W1H variables and designates a common group for all the replicas for update processing of the 1W1H variables.

In the update processing, for the 2W1H variables, the energy change due to replacement (changes in the values of four state variables) of the designated two columns or two rows is calculated by, for example, Equation (7). For the 1W1H variables, the energy change due to a change in the value of two state variables (one of the state variables having a value of 0 and the state variable having a value of 1) in the designated group is calculated for each of the state variables having a value of 0 by, for example, Equation (5). For the 1 bit variables, the energy change due to a change in the value of each 1 bit variable is calculated. For example, a change in a state variable that causes an energy change that minimizes the energy among the calculated energy changes is adopted, and the value of the state variable is updated. The searching unit 33 updates the local field as the value of the state variable is updated.

The searching unit 33 repeats processing as described above for the 2W1H variables or the 1W1H variables by changing the group, columns, or rows to be designated until a predetermined search end condition is satisfied and repeats the same processing for the first bit variable until a predetermined search end condition is satisfied. For example, the searching unit 33 outputs the values of all the state variables of each replica when the search end condition is satisfied to the control unit 34.

The searching unit 33 may be implemented by, for example, an application-specific electronic circuit such as an ASIC or an FPGA.

The control unit 34 designates a group, two columns, or two rows to be processed by the searching unit 33. The control unit 34 designates a group, two columns, or two rows to be processed in a predetermined order.

In addition, in a case where the storage unit 31 does not hold all the weight coefficients in Equation (1) by the limitation of storage capacity or the like, the control unit 34 reads a part of the weight coefficient group as described above from the storage apparatus 20 and causes the part of the weight coefficient group to be stored in the storage unit 31.

The control unit 34 sets various parameters used in update processing such as temperature parameters used in the simulated annealing method or the replica exchange method, initial values of the respective state variables, and the like in the searching unit 33.

For example, the control unit 34 receives the values (search results) of all the state variables when the search end condition is satisfied in the searching unit 33 and calculates the energy for every replica based on Equation (1). For example, the control unit 34 outputs the search results (values of all state variables) in the replica indicating the lowest energy as a solution of the problem to a display device or the like.

The searching unit 33 may calculate the energy for every replica based on the energy change due to the update of state variable.

The control unit 34 may be implemented by, for example, an application-specific electronic circuit such as an ASIC or an FPGA. The control unit 34 is not limited to this and may be a processor such as a CPU or a GPU.

The optimization apparatus 30 according to the second embodiment as described above operates by, for example, a similar processing flow to the flowchart illustrated in FIG. 6. However, in the processing in step S5, the energy change is calculated for each of the 2W1H variable, 1W1H variable, and 1 bit variable as described above.

According to the optimization apparatus 30 as described above, it is possible to obtain similar effects to those by the optimization apparatus 10 of the first embodiment and to perform optimization processing even in a case where a state variable subjected to a 1-hot constraint and a state variable not subjected to the 1-hot constraint are mixed.

The method of switching and utilizing two storage units 11a1 and 11a2 as illustrated in FIG. 7 is also applicable to the optimization apparatus 30 according to the second embodiment.

A plurality of sets of the storage units 11 and 31, the storage units 12a1 to 12ap and 32a1 to 32ap, and the searching unit 13 of the optimization apparatus 10 according to the first embodiment and the optimization apparatus according to the second embodiment may be provided.

Although an aspect of the optimization apparatus and optimization method of the present disclosure has been described based on embodiments, these are merely examples, and the present disclosure is not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization apparatus comprising:
a first storage unit to store a first weight coefficient group which is at least some of a plurality of weight coefficients indicative of a magnitude of interaction between a plurality of state variables included in an evaluation function that represents energy of an Ising model;
a plurality of second storage units, the each of the plurality of second storage units to store a second weight coefficient group related to a state variable having a value of 1 in any of a plurality of state variable groups respectively including the plurality of state variables among the plurality of weight coefficients;
a searching unit to output, for each of the plurality of state variable groups, a search result obtained by performing searching processing on a respective state variable group, the searching processing being configured to perform processing of searching for an optimum solution that minimizes the energy by repeatedly performing a first update process or a second update process; and
a control unit to designate two columns, two rows, or group common to the plurality of state variable groups,
wherein the first update process includes:
obtaining a first determination result by determining, based on an amount of change in the energy of the Ising model calculated using the first weight coefficient group and the second weight coefficient group, whether to replace values of first state variables included in designated two columns or two rows between two columns or between two rows in a matrix that the $N^2$ (N is an integer 2 or more) first state variables among the plurality of state variables are arranged in N rows and N columns; and
in accordance with the first determination result, performing updating by replacing the first state variables included in the designated two columns or two rows while satisfying a first constraint that a sum of values of first state variables included in each column and each row of the matrix is 1,
wherein the second update process includes:
obtaining a second determination result by determining, based on the amount of change in the energy, whether to perform update any two values among values of a plurality of second state variables included in a designated group among the plurality of state variables while satisfying a second constraint that a sum of values of the second state variables included in the designated group is 1; and
in accordance with the second determination result, performing updating of two values while satisfying a second constraint that a sum of the plurality of second state variables included in the designated group is 1.

2. The optimization apparatus according to claim 1, wherein the control unit replaces a target to be read as the first weight coefficient group and stored in the first storage unit among the plurality of weight coefficients stored in a storage apparatus for every predetermined number of the update processing.

3. The optimization apparatus according to claim 2, wherein the control unit performs reading of the first weight coefficient group from the storage apparatus by combining a plurality of reading methods.

4. The optimization apparatus according to claim 2, wherein the first storage unit includes a third storage unit and a fourth storage unit, and
the control unit reads a second target stored in the first storage unit as the first weight coefficient group from the storage apparatus and causes the second target to be stored in the fourth storage unit when a first target stored in the first storage unit as the first weight coefficient group is stored in the third storage unit and the update processing is performed using the first target.

5. The optimization apparatus according to claim 1, wherein the plurality of state variables include the N square first state variable subjected to the first constraint, the plurality of second state variables subjected to the second constraint, and a third state variable not subjected to the first constraint and the second constraint, and
the searching unit performs any of update by the replacement, update of two values, or update of a value of one third state variable based on the first weight coefficient group or the second weight coefficient group.

6. The optimization apparatus according to claim 1, wherein the searching unit updates the second weight coefficient group using the first weight coefficient group based on a result of the update processing.

7. An optimization method implemented by an optimization apparatus, the method comprising:
accessing first storage to store a first weight coefficient group which is at least some of a plurality of weight coefficients indicative of a magnitude of interaction between a plurality of state variables included in an evaluation function that represents energy of an Ising model;
accessing a plurality of second storages, the each of the plurality of second storages to store a second weight coefficient group related to a state variable having a value of 1 in any of a plurality of state variable groups respectively including the plurality of state variables among the plurality of weight coefficients;
outputting, for each of the plurality of state variable groups, a search result obtained by performing searching processing on a respective state variable group, the searching processing to perform processing of searching for an optimum solution that minimizes the energy by repeatedly performing a first update process or a second update process; and
designating two columns, two rows, or group common to the plurality of state variable groups, wherein the first update process includes:
obtaining a first determination result by determining, based on an amount of change in the energy of the Ising model calculated using the first weight coefficient group and the second weight coefficient group, whether to replace values of first state variables included in designated two columns or two rows between two columns or between two rows in a matrix that the $N^2$ (N is an integer 2 or more) first state variables among the plurality of state variables are arranged in N rows and N columns; and
in accordance with the first determination result, performing updating by replacing the first state variables included in the designated two columns or two rows while satisfying a first constraint that a sum of values of first state variables included in each column and each row of the matrix is 1,
wherein the second update process includes:
obtaining a second determination result by determining, based on the amount of change in the energy, whether to perform update any two values among values of a plurality of second state variables included in a designated group among the plurality of state variables while satisfying a second constraint that a sum of values of the second state variables included in the designated group is 1; and
in accordance with the second determination result, performing updating of the two values while satisfying a second constraint that a sum of the plurality of second state variables included in the designated group is 1.

* * * * *